United States Patent
Han et al.

(10) Patent No.: US 9,132,854 B2
(45) Date of Patent: Sep. 15, 2015

(54) FAULT TOLERANT APPARATUS AND METHOD FOR AN INDEPENDENT CONTROLLED STEERING IN A FOUR WHEEL DRIVE SYSTEM

(71) Applicants: Dong Seog Han, Daegu (KR); In Seok Yang, Daegu (KR)

(72) Inventors: Dong Seog Han, Daegu (KR); In Seok Yang, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 14/090,296

(22) Filed: Nov. 26, 2013

(65) Prior Publication Data

US 2015/0120145 A1 Apr. 30, 2015

(30) Foreign Application Priority Data

Oct. 28, 2013 (KR) .......................... 10-2013-0128708

(51) Int. Cl.
| | |
|---|---|
| *B62D 7/14* | (2006.01) |
| *B60W 10/04* | (2006.01) |
| *B60W 10/20* | (2006.01) |
| *B60W 30/02* | (2012.01) |
| *B60W 50/02* | (2012.01) |
| *B60W 50/029* | (2012.01) |

(52) U.S. Cl.
CPC .............. *B62D 7/148* (2013.01); *B60W 10/04* (2013.01); *B60W 10/20* (2013.01); *B60W 30/02* (2013.01); *B60W 50/0205* (2013.01); *B60W 50/029* (2013.01); *B60W 2050/0292* (2013.01)

(58) Field of Classification Search
USPC .......................................................... 701/43
See application file for complete search history.

(56) References Cited

U.S. PATENT DOCUMENTS

| 8,662,212 B2 * | 3/2014 | Lawson, Jr. .................. 180/6.48 |
| 2014/0145498 A1 * | 5/2014 | Yamakado et al. ............... 303/3 |

FOREIGN PATENT DOCUMENTS

| JP | 2009184575 A | * | 8/2009 |
| WO | WO 2012043683 | * | 4/2012 |

* cited by examiner

*Primary Examiner* — Mary Cheung
*Assistant Examiner* — Anne Mazzara
(74) *Attorney, Agent, or Firm* — Porzio, Bromberg & Newman, P.C.

(57) ABSTRACT

The present disclosure relates to fault management apparatus and method for an independently controlled steering system in a four wheel drive system. The apparatus includes: a steering system unit that is disposed at four wheels of a vehicle, controls steering of the wheels, and collects and transmits the state information of the wheels; and a control unit that controls the steering system unit in accordance with the state information transmitted from the steering system unit. According to the present disclosure, when there is a fault in one or more wheels of a four wheel drive vehicle, it is possible to stabilize the vehicle body by actively adjusting the steering angles of the wheels that normally work and the speed of the vehicle in accordance with the fault environment.

19 Claims, 14 Drawing Sheets

FAULT TOLERANT APPARATUS AND METHOD FOR AN INDEPENDENT CONTROLLED STEERING IN A FOUR WHEEL DRIVE SYSTEM

CROSS-REFERENCE TO RELATED APPLICATIONS

This application claims the benefit under 35 U.S.C. §119(a) of Korean Patent Application No. 10-2013-0128708, filed on Oct. 28, 2013, in the Korean Intellectual Property Office, the entire disclosure of which is incorporated herein by reference for all purpose.

BACKGROUND

1. Field

The following description relates to fault management apparatus and method for an independent controlled steering system in a four wheel drive system. In detail, the following description relates to fault management apparatus and method for an independently controlled steering system in a four wheel drive system which can stability a vehicle body and maintain turning performance of a vehicle by actively adjust the steering angles of wheels and the speed of the vehicle in accordance with the fault environment.

2. Description of the Prior Art

In general, four wheel drive vehicles are designed such that the inscribed circles of the steering angles of the wheels make coaxial circles in turning so that the turning radii of the wheels keep constant. However, when one or more steering systems for the wheels break, the centers of the inscribed circles of the steering angles cannot converge on one point, such that large stress is applied transversely to the vehicles that are rigid bodies; therefore, the structural safety of the vehicles is considerably deteriorated and it exerts critical influence on the safety of the driver in the vehicles.

Accordingly, studies about the technology of efficient steering control of a four wheel drive vehicles which can improve structural safety of a vehicle and contribute to the safety of a driver have been conducted.

Patent Document 1 (Korean Patent Registration No. 10-0590691) relates to an electric steering system for a vehicle, disclosing a technology of allowing stable steering by using the existing devices or components when there is a fault in a steering-driving motor in the steering system.

In detail, there is disclosed in Patent Document 1 a technology of controlling the braking force from brake systems to have a calculated value by sensing a fault in a steering-driving motor from the relationship between the amounts of input and output currents of the steering-driving motor and the rack displacement of the turning angle of a steering wheel, using a steering-driving motor sensing unit, and by calculating the braking force of the brake systems for the wheel such that the traveling direction of a vehicle changes in proportion to the turning direction and angle of the steering wheel, when there is a fault in the steering-driving motor.

Patent Document 2 (Korean Patent Publication No. 10-2013-0057879) discloses a technology that calculates torsion calculated from a steering angle detected by a steering angle sensor and the torque of a motor, calculates the difference between the equivalent steering angular speed and the steering angular speed of the motor including the torsion with reference to the torsion, and turns off the power, when the difference exceeds a threshold value.

In detail, in Patent Document 2, there is disclosed a technology that compensates for an error generated due to a torsional effect by calculating the correct equivalent steering angular speed including the torsional effect in response to a signal from a motor, using an ECU included in a fault sensing unit in a steering system, and increase safety in driving by turning off the power, when the difference between the equivalent steering angular speed and the steering angular speed exceeds a threshold value, that is, only when a problem is actually generated.

However, Patent Documents 1 and 2 disclose only the technology of controlling the turning direction and angle through braking, when there is a fault in a steering system, such that the turning radius of a vehicle cannot be controlled at the same time.

SUMMARY

The present disclosure provides fault management apparatus and method for an independently controlled steering system in a four wheel drive system which can stabilize a vehicle body by actively adjusting the steering angles of wheels, which normally work, and the speed of the vehicle in accordance with the fault environment, when there is a fault in one or more wheels of a four wheel drive vehicle.

Further, the present disclosure provides fault management apparatus and method for an independently controlled steering system in a four wheel drive system which can keep turning performance of a vehicle by keeping the turning radius constant before and after a fault is generated, in the process of managing a fault.

In a general aspect, there is provided a fault management apparatus for an independently controlled steering system in a four wheel drive system, which includes: a steering system unit that is disposed at four wheels of a vehicle, controls steering of the wheels, and collects and transmits the state information of the wheels; and a control unit that controls the steering system unit in accordance with the state information transmitted from the steering system unit, in which the control unit includes: a turning center coordinate calculating unit that calculates turning center coordinates such that the tangential lines of all of the wheels converge on one point and the turning radii when a fault is generated are maintained, when fault information is included in the state information transmitted from the steering system unit; a speed calculating unit that calculates a speed for keeping the turning radius when a fault is generated on the basis of the turning center coordinates calculated by the turning center coordinate calculating unit; a steering angle calculating unit that calculates the steering angles of steering systems without a fault on the basis of the turning center coordinates calculated by the turning center coordinate calculating unit; and a speed/steering angel control unit that controls the steering angle and the speed of the vehicle by transmitting the steering angles calculated by the steering angle calculating unit to the steering systems without a fault and transmitting the speed calculated by the speed calculating unit to an engine control unit.

The turning center coordinate calculating unit may calculate the turning center coordinates by calculating the intersection of the tangential line of the wheel with a fault and a circle having the turning radius when a fault is generated as its radius.

The turning center coordinates of the turning center when a steering system breaks may be calculated by the following Expression 1, $$y = \tan(\delta_{km})(x-p)+q$$

$$x^2 + y^2 = R^2 \qquad \text{<Expression 1>}$$

where $\delta_{km}$ the steering angle of the wheel with a fault, the subscript k is a symbol for showing which one of the left wheel steering system and the right wheel steering system is the steering system with the fault, the subscript m is a symbol for showing which one of the front steering system and the rear steering system is the steering system with the fault, and p and q are the rectangular coordinates of the steering system with the fault.

The turning center coordinates calculated by Expression 1 may be $(x_{rec}, y_{rec})$, $$x_{rec} = \frac{-b_{km} \pm \sqrt{(b_{km})^2 - 4a_{km}c_{km}}}{2a_{km}}$$

$$y_{rec} = \tan(\delta_{km})(x_{rec} - p) + q$$

$$a_{km} = 1 + \tan^2(\delta_{km})$$

$$b_{km} = 2(q\tan(\delta_{km}) - p\tan^2(\delta_{km}))$$

$$c_{km} = p^2\tan^2(\delta_{km}) - 2pq\tan(\delta_{km}) + q^2 - R^2$$

The speed calculating unit may calculate a corrected speed for maintaining the turning radius when the fault is generated, from the following Expression 3, $$V_r = R\delta_{o'} \qquad <\text{Expression 3}>$$

$$\delta_{o'} = \arctan\left(\frac{y_{rec}}{x_{rec}}\right)$$

where Vr is a corrected speed of the vehicle, R is the turning radius when a fault is generated, and $\delta_{o'}$ is a movement direction angular speed of the vehicle.

The steering angle calculating unit may calculate the corrected steering angle of a steering system without a fault from the following Expression 4, $$\delta_{km} = \arctan\left(\frac{y_{rec} - q}{x_{rec} - p}\right) \qquad <\text{Expression 4}>$$

where $\delta_{km}$ is the corrected steering angle of a steering system without a fault, and p and q are the rectangular coordinates of a steering system that normally works.

The steering angle calculating unit may calculate the steering angle $\delta_{rf}$ of the right front wheel steering system from $$\arctan\left(\frac{y_{rec} - a_r}{x_{rec} - w_r/2}\right)$$

and the steering angle $\delta_{lr}$ of the left rear wheel steering system from $$\arctan\left(\frac{y_{rec} + a_r}{x_{rec} + w_r/2}\right),$$

and the steering angle $\delta_{rr}$ of the right rear wheel steering system from $$\arctan\left(\frac{y_{rec} + a_r}{a_{rec} - w_r/2}\right),$$

when there is a fault in the left front steering system.

The steering angle calculating unit may calculate the steering angle $\delta_{lf}$ of the left front wheel steering system from $$\arctan\left(\frac{y_{rec} - a_f}{x_{rec} + w_f/2}\right),$$

the steering angle $\delta_{lr}$ of the left rear wheel steering system from $$\arctan\left(\frac{y_{rec} + a_r}{x_{rec} + w_r/2}\right),$$

and the steering angle $\delta_{rr}$ of the right rear wheel steering system from $$\arctan\left(\frac{y_{rec} + a_r}{x_{rec} - w_r/2}\right),$$

when there is a fault in the right front steering system.

The steering angle calculating unit may calculate the steering angle $\delta_{lf}$ of the left front wheel steering system from $$\arctan\left(\frac{y_{rec} - a_f}{x_{rec} + w_f/2}\right),$$

calculates the steering angle $\delta_{rf}$ of the right front wheel steering system from $$\arctan\left(\frac{y_{rec} - a_f}{x_{rec} - w_f/2}\right),$$

and the steering angle $\delta_{rr}$ of the right rear wheel steering system from $$\arctan\left(\frac{y_{rec} + a_r}{x_{rec} - w_r/2}\right),$$

when there is a fault in the left rear steering system.

The steering angle calculating unit may calculate the steering angle $\delta_{lf}$ of the left front wheel steering system from $$\arctan\left(\frac{y_{rec} - a_f}{x_{rec} + w_f/2}\right),$$

the steering angle $\delta_{rf}$ of the right front wheel steering system from $$\arctan\left(\frac{y_{rec} - a_f}{x_{rec} - w_f/2}\right),$$

and the steering angle $\delta_{lr}$ of the left rear wheel steering system from $$\arctan\left(\frac{y_{rec} + a_r}{x_{rec} + w_r/2}\right),$$

when there is a fault in the right rear steering system.

The control unit may be an engine control unit or a specific independent module.

A method for an independently controlled steering system in a four wheel drive system includes: a state information transmission step that transmits state information of steering systems for four wheels of a vehicle; a turning center coordinate calculation step that calculates turning center coordinates such that the tangential lines of all of the wheels converge on one point and the turning radii when a fault is generated are maintained, when fault information is included in the state information transmitted from the steering systems; a speed calculation step that calculates a speed for keeping the turning radius when a fault is generated on the basis of the turning center coordinates calculated in the turning center coordinate calculation step; a steering angle calculation step that calculates the steering angles of steering systems without a fault on the basis of the turning center coordinates calculated in the turning center coordinate calculation step; and a speed/steering angel control step that controls the steering angle and the speed of the vehicle by transmitting the steering angles calculated in the steering angle calculation step to the steering systems without a fault and transmitting the speed calculated in the speed calculation step to an engine control unit.

In the turning center coordinate calculation step, the turning center coordinates may be calculated by calculating the intersection of the tangential line of the wheel with a fault and a circle having the turning radius when a fault is generated as its radius.

The turning center coordinates of the turning center when a steering system breaks may be calculated by the following Expression 1, $$y = \tan(\delta_{km})(x-p) + q$$

$$x^2 + y^2 R^2 \quad \text{<Expression 1>}$$

where $\delta_{km}$ the steering angle of the wheel with a fault, the subscript k is a symbol for showing which one of the left wheel steering system and the right wheel steering system is the steering system with the fault, the subscript m is a symbol for showing which one of the front steering system and the rear steering system is the steering system with the fault, and p and q are the rectangular coordinates of the steering system with the fault.

The turning center coordinates calculated by Expression 1 may be $(x_{rec}, y_{rec})$, $$x_{rec} = \frac{-b_{km} \pm \sqrt{(b_{km})^2 - 4a_{km}c_{km}}}{2a_{km}}$$

-continued $$y_{rec} = \tan(\delta_{km})(x_{rec} - p) + q$$

$$a_{km} = 1 + \tan^2(\delta_{km})$$

$$b_{km} = 2(q\tan(\delta_{km}) - p\tan^2(\delta_{km}))$$

$$c_{km} = p^2\tan^2(\delta_{km}) - 2pq\tan(\delta_{km}) + q^2 - R^2$$

In the speed calculation step, a speed for maintaining the turning radius when the fault is generated may be calculated from the following Expression 3, $$V_r = R\delta_{o'} \quad \text{<Expression 3>}$$

$$\delta_{o'} = \arctan\left(\frac{y_{rec}}{x_{rec}}\right)$$

where Vr is a corrected speed of the vehicle, R is the turning radius when a fault is generated, and $\delta_{o'}$ is a movement direction angular speed of the vehicle.

In the steering angle calculation step, the corrected steering angle of a steering system without a fault may be calculated from the following Expression 4, $$\delta_{km} = \arctan\left(\frac{y_{rec} - q}{x_{rec} - p}\right) \quad \text{<Expression 4>}$$

where $\delta_{km}$ is the corrected steering angle of a steering system without a fault, and p and q are the rectangular coordinates of a steering system that normally works.

In the steering angle calculation step, the steering angle $\delta_{lf}$ of the right front wheel steering system may be calculated from $$\arctan\left(\frac{y_{rec} - a_f}{x_{rec} - w_f/2}\right),$$

the steering angle $\delta_{rf}$ of the left rear wheel steering system may be calculated from $$\arctan\left(\frac{y_{rec} + a_r}{x_{rec} + w_r/2}\right),$$

and the steering angle $\delta_{rr}$ of the right rear steering system may be calculated from $$\arctan\left(\frac{y_{rec} + a_r}{x_{rec} - w_r/2}\right),$$

when there is a fault in the left front steering system.

In the steering angle calculation step, the steering angle $\delta_{lf}$ of the left front wheel steering system may be calculated from $$\arctan\left(\frac{y_{rec} - a_f}{x_{rec} + w_f/2}\right),$$

the steering angle $\delta_{lr}$ of the left rear wheel steering system may be calculated from $$\arctan\left(\frac{y_{rec}+a_r}{x_{rec}+w_r/2}\right),$$

and the steering angle $\delta_{rr}$ of the right rear wheel steering system may be calculated from $$\arctan\left(\frac{y_{rec}+a_r}{x_{rec}-w_r/2}\right),$$

when there is a fault in the right front steering system.

In the steering angle calculation step, the steering angle $\delta_{lf}$ of the left front wheel steering system may be calculated from $$\arctan\left(\frac{y_{rec}-a_f}{x_{rec}+w_f/2}\right),$$

the steering angle $\delta_{rf}$ of the right front wheel steering system may be calculated from $$\arctan\left(\frac{y_{rec}-a_f}{x_{rec}-w_f/2}\right),$$

and the steering angle $\delta_{rr}$ of the right rear wheel steering system may be calculated from $$\arctan\left(\frac{y_{rec}+a_r}{x_{rec}-w_r/2}\right),$$

when there is a fault in the left rear steering system.

In the steering angle calculation step, the steering angle $\delta_{lf}$ of the left front wheel steering system may be calculated from $$\arctan\left(\frac{y_{rec}-a_f}{x_{rec}+w_f/2}\right),$$

the steering angle $\delta_{rf}$ of the right front wheel steering system may be calculated from $$\arctan\left(\frac{y_{rec}-a_f}{x_{rec}-w_f/2}\right),$$

and the steering angle $\delta_{lr}$ of the left rear wheel steering system may be calculated from $$\arctan\left(\frac{y_{rec}+a_r}{x_{rec}+w_r/2}\right),$$

when there is a fault in the right rear steering system.

According to the present disclosure, when there is a fault in one or more wheels of a four wheel drive vehicle, it is possible to stabilize the vehicle body by actively adjusting the steering angles of the wheels that normally work and the speed of the vehicle in accordance with the fault environment.

Further, it is possible to keep the turning performance of a vehicle by keeping the turning radius constant before and after a fault is generated, in the process of managing a fault.

Figure 1:
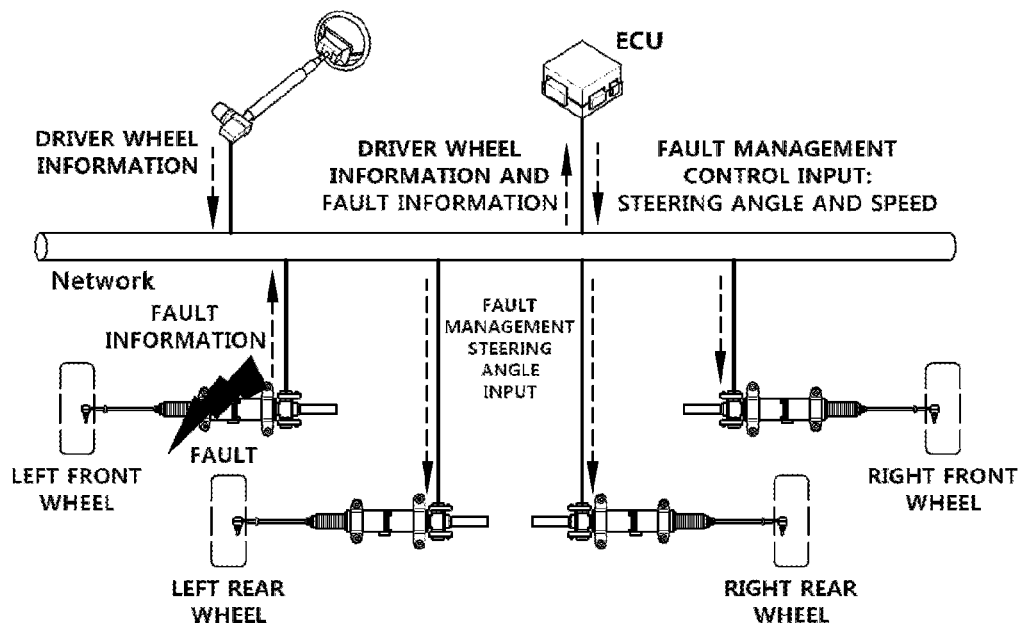
FIG. 1 is a conceptual view of a system where the fault management technology of an independently controlled steering system in a four wheel drive system according to the present disclosure is used.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a conceptual view of a system where the fault management technology of an independently controlled steering system in a four wheel drive system according to the present disclosure is used.

Referring to FIG. 1, according to the entire system, a steering system is disposed at four wheels, that is, the left front wheel, the right front wheel, the left rear wheel, and the right rear wheel and transmits state information including fault information generated in the wheels in real time to a control module such as an engine control unit through a network. Though will be described in detail, the control module controls the wheels such that the tangential lines of the wheels converge on one point while maintaining the turning radii when a fault is generated, on the basis of the state information transmitted from the steering systems.

Figure 2:
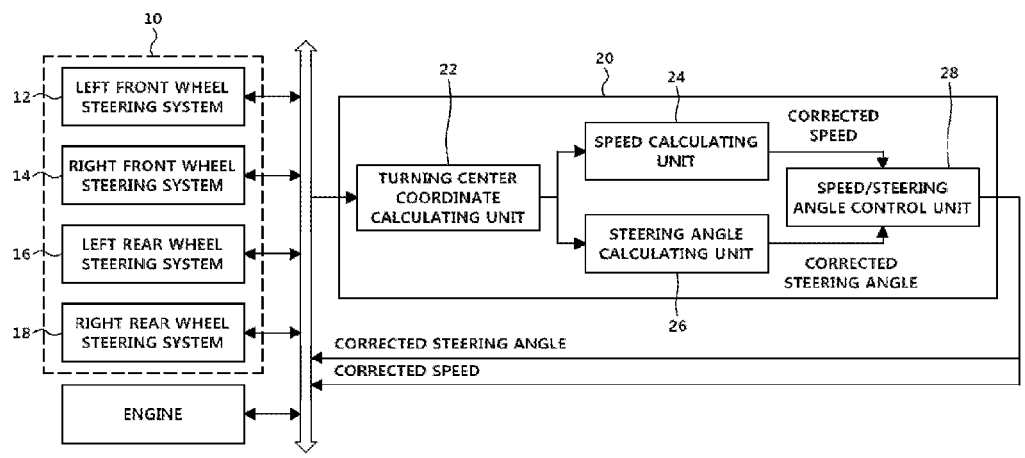
FIG. 2 is a diagram illustrating a fault management apparatus for an independently controlled steering control system in a four wheel drive system according to an embodiment of the present disclosure.

FIG. 2 is a diagram illustrating a fault management apparatus for an independently controlled steering control system in a four wheel drive system according to an embodiment of the present disclosure.

Referring to FIG. 2, the fault management apparatus for an independently controlled steering system in a four wheel drive system according to an embodiment of the present disclosure includes a steering system unit 10 and a control unit 20.

The steering system unit 10 is disposed at four wheels of a vehicle, controls steering of the wheels and collects and transmits the state information of the wheels. Further, when any one of steering systems in the steering system unit 10 breaks, the steering system transmits fault information to the control unit 20 and the steering systems without a fault receive corrected steering angles calculated by the control unit 20 and control the steering angle of their wheels.

The control unit 20 controls the steering system unit 10 in accordance with the state information transmitted from the steering system unit 10. The control unit 20 may be an ECU (Engine Control Unit) or a specific module independent from an engine control unit.

For example, the control unit 20 may include a turning center coordinate calculating unit 22, a speed calculating unit 24, a steering angle calculating unit 26, and a speed/steering angel control unit 28.

When fault information is included in the state information transmitted from the steering system unit 10, the turning center coordinate calculating unit 22 calculates turning center coordinates such that the tangential lines of all of the wheels converge on one point and the turning radii when a fault is generated are maintained.

The turning center coordinate calculating unit 22 may calculate the turning center coordinates by calculating the intersection of the tangential line of the wheel with a fault and the circle with the turning radius when the fault is generated, as its radius.

The speed calculating unit 24 calculates a speed for keeping the turning radius when a fault is generated on the basis of the turning center coordinates calculated by the turning center coordinate calculating unit 22.

The steering angle calculating unit 26 calculates the steering angles of steering systems without a fault on the basis of the turning center coordinates calculated by the turning center coordinate calculating unit 22.

The speed/steering angel control unit 28 controls the steering angle and the speed of a vehicle by transmitting the steering angles calculated by the steering angle calculating unit 26 to the steering systems without a fault and transmitting the speed calculated by the speed calculating unit 24 to the engine control unit.

Hereinafter, the process of managing a fault by the fault management apparatus for an independently controlled steering system in a four wheel derive system according to an embodiment of the present disclosure is described in detail with reference to FIGS. 4 to 9.

Figure 4:
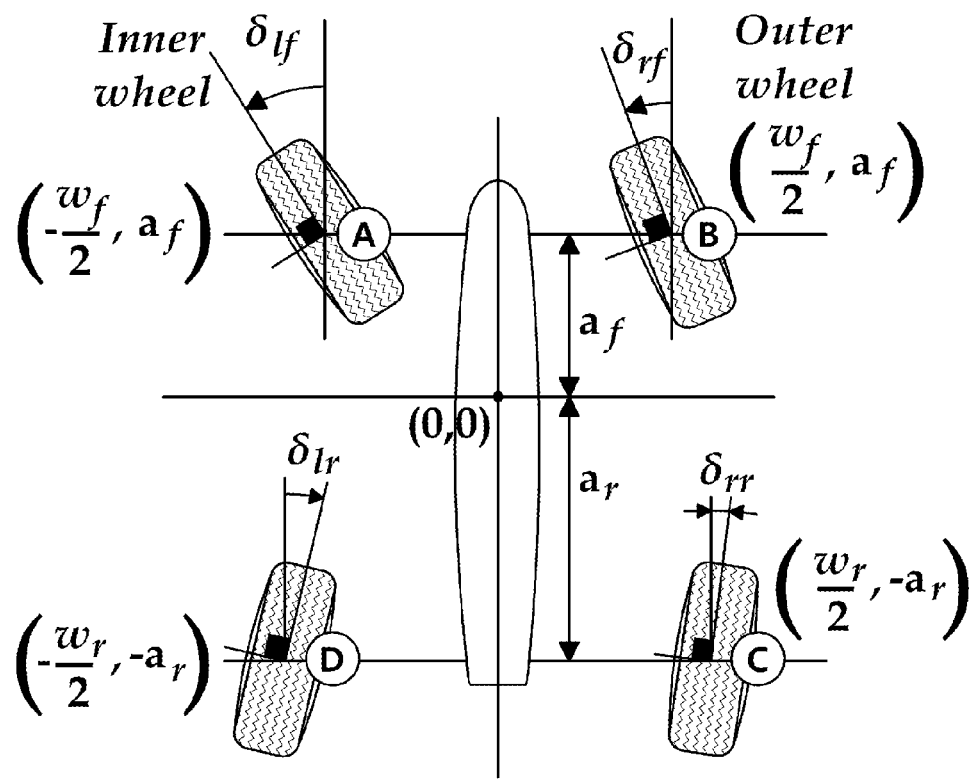
FIG. 4 is a diagram showing a rectangular coordinate system of a steering system that is used in an embodiment of the present disclosure.

Rectangular coordinate system of a steering system that is used in an embodiment of the present disclosure is described first with reference to FIG. 4. The coordinate (0, 0) is the origin of the rectangular coordinate system around a vehicle, $A(-w_f/2, a_f)$ is the coordinate of the left front wheel steering system, $B(w_f/2, a_f)$ is the coordinate of the right front wheel steering system, $C(w_r/2, -a_r)$ is the coordinate of the right rear wheel steering system, $D(-w_r/2, -a_r)$ is the coordinate of the left rear wheel steering system, $w_f$ is the tread of the front axle, $w_r$ is the tread of the rear axle, $a_f$ is the distance between the center point and the front axle, and $a_r$ is the distance between the center point and the rear axle.

Figure 5:
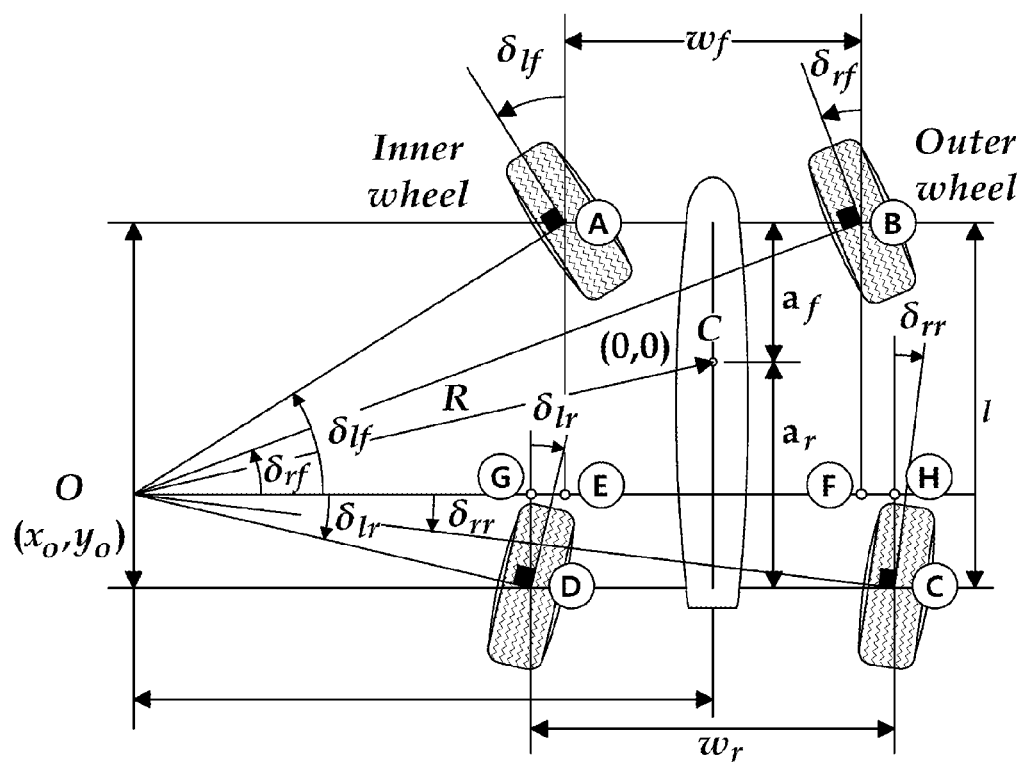
FIG. 5 is a diagram showing transverse movement of a four wheel drive vehicle that normally works.

Referring to FIG. 5 showing transverse movement of a four wheel drive vehicle that normally works, the four wheel drive vehicle is designed such that the tangential lines of the wheels converge on one point, and accordingly, the inscribed circles of all of the wheels make coaxial circles.

Figure 6:
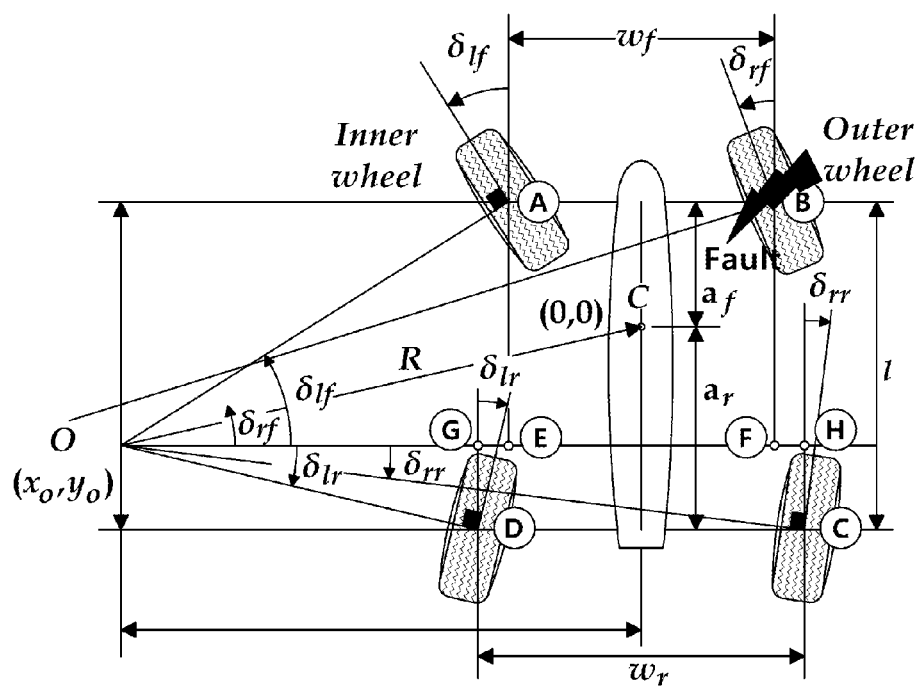
FIG. 6 is a diagram showing transverse movement of a four wheel drive vehicle with a fault in a steering system.

However, referring to FIG. 6 showing transverse movement of a four wheel drive vehicle with a fault in a steering system, when there is a fault in one or more of the steering systems operated in a four wheel drive system, the tangential lines of the wheels fail to converge on one point. Accordingly, the transverse structural safety of a vehicle which is a rigid is considerably influenced. FIG. 6 shows when the right front wheel breaks.

The fault management technology proposed by the embodiment is as follows.

Figure 7:
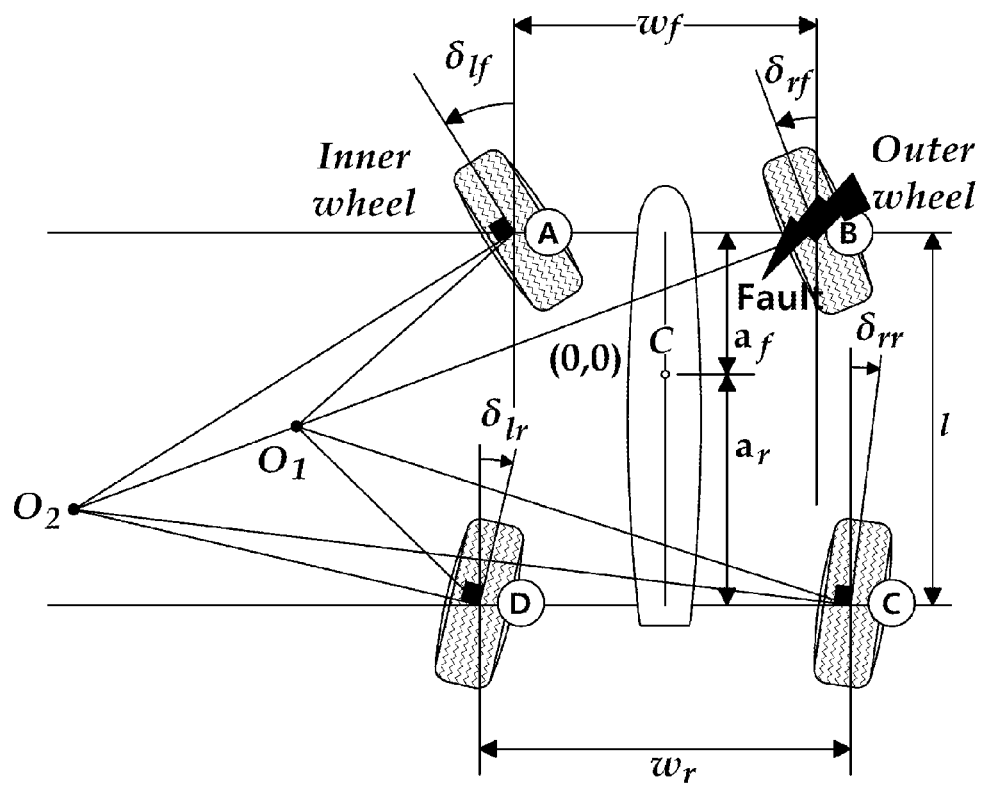
FIG. 7 is a view illustrating the basic concept of the fault management technology for a steering system in a four wheel drive vehicle.
Figure 8:
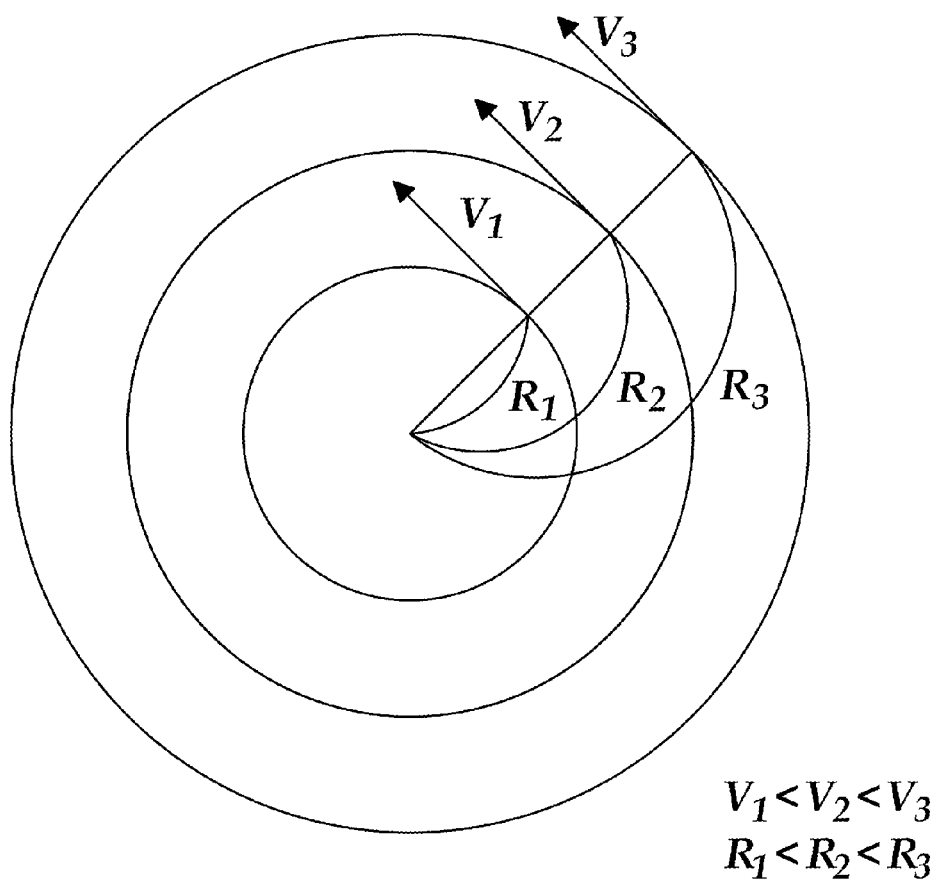
FIG. 8 is a diagram showing changes in turning radius according to the speed of a vehicle.

Referring first FIG. 7 illustrating basic concept of the fault management technology for the steering system in a four wheel drive vehicle, the tangential lines are controlled to converge on one point by adjusting the normal wheels without a fault. However, as can be seen from FIG. 7 the tangential lines of the wheels can converge on several points $(O_1, O_2)$ and the turning radius of the vehicle changes in accordance with the position of the cross point. In practice, the points where the tangential lines of the wheels meet are related to the turning speed of the vehicle. That is, as shown in FIG. 8, the larger the speed of a vehicle, the larger the turning radius becomes.

Accordingly, in the embodiment, the turning radius is controlled to keep the radius before a fault is generated, by adjusting the speed of the vehicle too. That is, referring to FIG. 9 illustrating the method of correcting the turning center coordinates that converge the tangential lines of all of the wheel on one point and maintains the turning radius before a fault is generated, in accordance with an embodiment of the present disclosure, the embodiment finds a new turning center $O_{reconf}$ by adjusting the steering angles of normal wheels and the speed of the vehicle.

Figure 9:
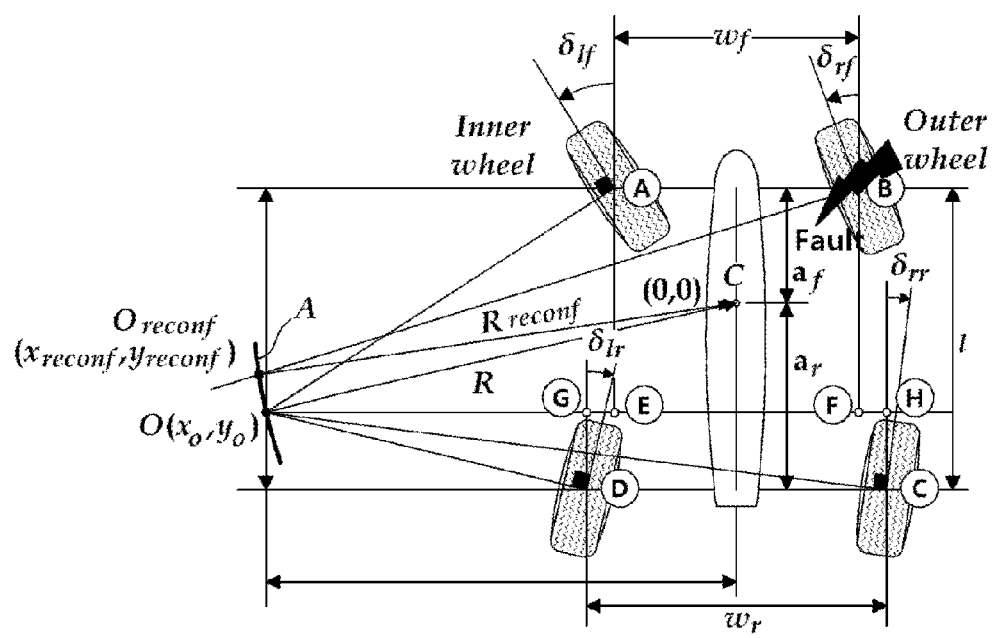
FIG. 9 is a diagram illustrating a method of correcting the coordinates of a turning center such that the tangential lines of the whole wheels converge on one point and the turning radius when a fault is generated is maintained, according to an embodiment of the present disclosure.

The detailed operation of the embodiment is described hereafter mainly with reference to FIG. 9, for each of calculation of turning center coordinates, correction of the vehicle speed, and correction of the steering angle.

<Calculation of Turning Center Coordinates>

As shown in FIG. 6, when a fault is generated in the right front wheel steering system 14 while a vehicle travels, the turning centers of the wheels do not meet at one point. Accordingly, large stress is applied transversely to the vehicle and the safety is considerably influenced. In the embodiment, faults are managed in real time by adjusting the steering angles of the wheels that normally work and the speed of the vehicle.

Referring to FIG. 9, the point that satisfies both of the condition that the turning centers of the wheels converge on one point and the condition that the turning radius is maintained is the intersection of the tangential line with a fault and the circle having the existing turning radius, that is, when the fault is generated, as its radius. That is, such new turning center coordinates can be obtained by uniting the formulae in the following Expression 1.

$$y = \tan(\delta_{km})(x-p)+q$$

$$x^2 + y^2 R^2 \qquad \text{<Expression 1>}$$

In Expression 1, $\delta_{km}$ the steering angle of the wheel with a fault, the subscript k is a symbol for showing which one of the left wheel steering system and the right wheel steering system is the steering system with the fault, the subscript m is a symbol for showing which one of the front steering system and the rear steering system is the steering system with the fault, and p and q are the rectangular coordinates of the steering system with the fault. This is arranged as in the following Table 1 with reference to FIG. 5.

TABLE 1

|   | k = l, m = f | k = r, m = f | k = l, m = r | k = r, m = r |
|---|---|---|---|---|
| P | $-w_f/2$ | $w_f/2$ | $-w_r/2$ | $w_r/2$ |
| Q | $a_f$ | $a_f$ | $-a_r$ | $-a_r$ |

In Table 1, the parameters $a_f$, $a_r$, $w_f$, and $w_r$ are defined, as in Table 2.

TABLE 2

| Symbol | Definition | Value | Unit |
|---|---|---|---|
| $a_f$ | Distance between center point and front axle | 1.40 | m |
| $a_r$ | Distance between center point and rear axle | 1.40 | m |
| $w_f$ | Tread of front axle | 1.35 | m |
| $w_r$ | Tread of rear axle | 1.40 | m |

By uniting the formulae in Expression 1, the following expression 2 that is a quadratic equation can be obtained.

$$(1+\tan^2(\delta_{km}))x^2+2(q\tan(\delta_{km})-p\tan^2(\delta_{km}))x+p^2\tan^2(\delta_{km})-2pq\tan(\delta_{km})+q^2-R^2=0 \qquad \text{[Expression 2]}$$

The coefficients in Expression 2 are defined as follows.

$$a_{km}=1+\tan^2(\delta_{km})$$

$$b_{km}=2(q\tan(\delta_{km})-p\tan^2(\delta_{km}))$$

$$c_{km}=p^2\tan^2(\delta_{km})-2pq\tan(\delta_{km})+q^2-R^2$$

Calculating Expression 2, the x-coordinate of a new turning center can be obtained as follow, $$x_{rec} = \frac{-b_{km} \pm \sqrt{(b_{km})^2 - 4a_{km}c_{km}}}{2a_{km}}$$

where the symbols + and − before the root are signs for right turning and left turning of a vehicle and the coefficients $a_{km}$, $b_{km}$, and $c_{km}$ can be generalized as the following Table 3.

TABLE 3

| Position of fault | $a_{km}$ | $b_{km}$ | $c_{km}$ |
|---|---|---|---|
| Front rear wheel (k = l, m = f) | $1 + \tan^2(\delta_{lf})$ | $2a_f\tan(\delta_{lf}) + \omega_f\tan^2(\delta_{lf})$ | $\left(\frac{w_f}{2}\right)^2\tan^2(\delta_{lf}) + a_fw_f\tan(\delta_{lf}) + (a_f)^2 - R^2$ |
| Right front wheel (k = r, m = f) | $1 + \tan^2(\delta_{rf})$ | $2a_f\tan(\delta_{rf}) - \omega_f\tan^2(\delta_{rf})$ | $\left(\frac{w_f}{2}\right)^2\tan^2(\delta_{rf}) - a_fw_f\tan(\delta_{rf}) + (a_f)^2 - R^2$ |
| Left rear wheel (k = l, m = r) | $1 + \tan^2(\delta_{lr})$ | $-2a_r\tan(\delta_{lr}) + \omega_r\tan^2(\delta_{lr})$ | $\left(\frac{w_r}{2}\right)^2\tan^2(\delta_{lr}) - a_rw_r\tan(\delta_{lr}) + (a_r)^2 - R^2$ |
| Right rear wheel (k = r, m = r) | $1 + \tan^2(\delta_{rr})$ | $-2a_r\tan(\delta_{rr}) - \omega_r\tan^2(\delta_{rr})$ | $\left(\frac{w_r}{2}\right)^2\tan^2(\delta_{rr}) + a_rw_r\tan(\delta_{rr}) + (a_r)^2 - R^2$ |

In Table 3, the subscript k of the coefficient a, b, and c means the left (l) or the right (r) and the subscript m means the front (f) or the rear (r).

Further, substituting $x_{rec}$ that is the x-coordinate of the calculated turning center, the y-coordinate $y_{rec}$ of the new turning center for fault management is as follow.

$$y_{rec}=\tan(\delta_{km})(x_{rec}-p)+q$$

The y-coordinate of the turning center can be generalized, as in the following Table 4, in accordance with the position of a fault.

TABLE 4

|   | k = l | k = r |
|---|---|---|
| m = f | $\tan(\delta_{lf})\left(x_{rec} + \frac{w_f}{2}\right) + a_f$ | $\tan(\delta_{rf})\left(x_{rec} - \frac{w_f}{2}\right) + a_f$ |
| m = r | $\tan(\delta_{lr})\left(x_{rec} + \frac{w_r}{2}\right) - a_r$ | $\tan(\delta_{rr})\left(x_{rec} - \frac{w_r}{2}\right) - a_r$ |

<Correction of Vehicle Speed>

On the basis of the coordinate ($x_{rec}$, $y_{rec}$) of the new turning center, a corrected speed of a vehicle for keeping the radius is calculated by the following Expression 3.

$$V_r=R\delta_o, \quad \delta_o\arctan(y_{rec}/x_{rec}) \qquad \text{[Expression 3]}$$

In Expression 3, Vr is a corrected speed of a vehicle, R is the turning radius when a fault is generated, $\delta_o$ is the movement direction angular speed of the vehicle, $x_{rec}$ is the x-coordinate of the turning center calculated by Expression 1, and $y_{rec}$ is the y-coordinate of the turning center calculated by Expression 1. The speed calculating unit 24 of the embodiment calculates a speed for keeping the turning radius when the fault is generated, through Expression 3.

<Correction of Steering Angle>

On the basis of the coordinate $(x_{rec}, y_{rec})$ of the new turning center, a corrected steering angle reconfigured for managing a fault can be calculated by the following Expression 4.

$$\delta_{km} = \arctan\left(\frac{y_{rec} - q}{x_{rec} - p}\right) \quad \text{[Expression 4]}$$

In Expression 4, the point (p, q) is the rectangular coordinate of a steering system that normally works and the coordinate values follow Table 1.

Accordingly, Expression 4 can be expressed as in the following Table 5, from Tables 1, 3, and 4.

TABLE 5

| | | Corrected steering angel for managing fault | | | |
|---|---|---|---|---|---|
| | | k = l, m = f | k = r, m = f | k = l, m = r | k = r, m = r |
| Steering system with fault | k = l, m = f | broken | $\arctan\left(\frac{y_{rec} - a_f}{x_{rec} - w_f/2}\right)$ | $\arctan\left(\frac{y_{rec} + a_r}{x_{rec} + w_r/2}\right)$ | $\arctan\left(\frac{y_r + a_r}{x_r - w_r/2}\right)$ |
| | k = r, m = f | $\arctan\left(\frac{y_{rec} - a_f}{x_{rec} + w_f/2}\right)$ | broken | $\arctan\left(\frac{y_{rec} + a_r}{x_{rec} + w_r/2}\right)$ | $\arctan\left(\frac{y_r + a_r}{x_r - w_r/2}\right)$ |
| | k = l, m = r | $\arctan\left(\frac{y_{rec} - a_f}{x_{rec} + w_f/2}\right)$ | $\arctan\left(\frac{y_{rec} - a_f}{x_{rec} - w_f/2}\right)$ | broken | $\arctan\left(\frac{y_r - a_r}{x_r - w_r/2}\right)$ |
| | k = r, m = r | $\arctan\left(\frac{y_{rec} - a_f}{x_{rec} + w_f/2}\right)$ | $\arctan\left(\frac{y_{rec} - a_f}{x_{rec} - w_f/2}\right)$ | $\arctan\left(\frac{y_{rec} + a_r}{x_{rec} + w_r/2}\right)$ | broken |

According to Table 5, when the right front wheel steering system breaks, the corrected steering angle for managing the fault has only to follow the column of k=r and m=f in Table 5.

That is, the steering angle calculating unit 26 of the embodiment calculates the steering angle $\delta_{rf}$ of the right front wheel steering system 14 from $$\arctan\left(\frac{y_{rec} - a_f}{x_{rec} - w_f/2}\right)$$

and the steering angle $\delta_{lr}$ of the left rear wheel steering system 16 from $$\arctan\left(\frac{y_{rec} + a_r}{x_{rec} + w_r/2}\right),$$

and the steering angle $\delta_{rr}$ of the right rear wheel steering system 18 from $$\arctan\left(\frac{y_{rec} + a_r}{x_{rec} - w_r/2}\right),$$

1) when there is a fault in the left front steering system, calculates the steering angle $\delta_{lf}$ of the left front wheel steering system 12 from $$\arctan\left(\frac{y_{rec} - a_f}{x_{rec} + w_f/2}\right),$$

the steering angle $\delta_{lr}$ of the left rear wheel steering system 16 from $$\arctan\left(\frac{y_{rec} + a_r}{x_{rec} + w_r/2}\right),$$

and the steering angle $\delta_{rr}$ of the right rear wheel steering system 18 from $$\arctan\left(\frac{y_{rec} + a_r}{x_{rec} - w_r/2}\right),$$

2) when there is a fault in the right front steering system, calculates the steering angle $\delta_{lf}$ of the left front wheel steering system 12 from $$\arctan\left(\frac{y_{rec} - a_f}{x_{rec} + w_f/2}\right),$$

the steering angle $\delta_{rf}$ of the right front wheel steering system 14 from $$\arctan\left(\frac{y_{rec} - a_f}{x_{rec} - w_f/2}\right),$$

and the steering angle $\delta_{rr}$ of the right rear wheel steering system 18 from $$\arctan\left(\frac{y_{rec} + a_r}{x_{rec} - w_r/2}\right),$$

3) when there is a fault in the left rear steering system, and calculates the steering angle $\delta_{lf}$ of the left front wheel steering system 12 from $$\arctan\left(\frac{y_{rec} - a_f}{x_{rec} + w_f/2}\right),$$

the steering angle $\delta_{rf}$ of the right front wheel steering system 14 from $$\arctan\left(\frac{y_{rec} - a_f}{x_{rec} - w_f/2}\right),$$

and the steering angle $\delta_{lr}$ of the left rear wheel steering system 16 from $$\arctan\left(\frac{y_{rec} + a_r}{x_{rec} + w_r/2}\right),$$

4) when there is a fault in the right rear steering system.

A simulation result on the fault management apparatus for an independently controlled steering system in a four wheel drive system according to an embodiment of the present invention is described hereafter.

First, the assumption for the simulation is as follows.

The performance of the right front wheel decreases by 20% (($\delta_{rf}$: 14.3887°→11.511°, the speed of the vehicle when a fault is generated is 24.4412 km/h, the coordinate of the turning center is (−31.045, −6.7376), and the turning radius is 31.7678 m. The parameters of the vehicle are as defined in Table 1.

The following Table 6 shows changed correction and corrected steering angle of the wheel in the vehicle for managing a fault, and the turning center coordinate and the turning radius changed after the fault is managed.

TABLE 6

|  | Before fault | After managing fault |
| --- | --- | --- |
| $\delta_{lf}$ | 15° | 6.9185° |
| $\delta_{lr}$ | 9.9762° | 6.924° |
| $\delta_{rr}$ | 9.5445° | 6.6244° |
| Vehicle speed | 24.4412 km/h | 18.5214 km/h |
| Turning center | (−31.045, −6.7376) | (−31.3521, −5.1224) |
| Turning radius | 31.7678 m | 31.7678 m |

In table 6, it can be seen that after the fault is managed, the turning center of the vehicle moved about −30 cm on the x axis and about 1.6 m on the y axis and the speed of the vehicle reduced by about 6 km/h. It can be seen that the turning radius is kept due to the decrease in vehicle speed.

FIGS. 10 to 15 show the simulation results on movement of a vehicle turning.

Figure 10:
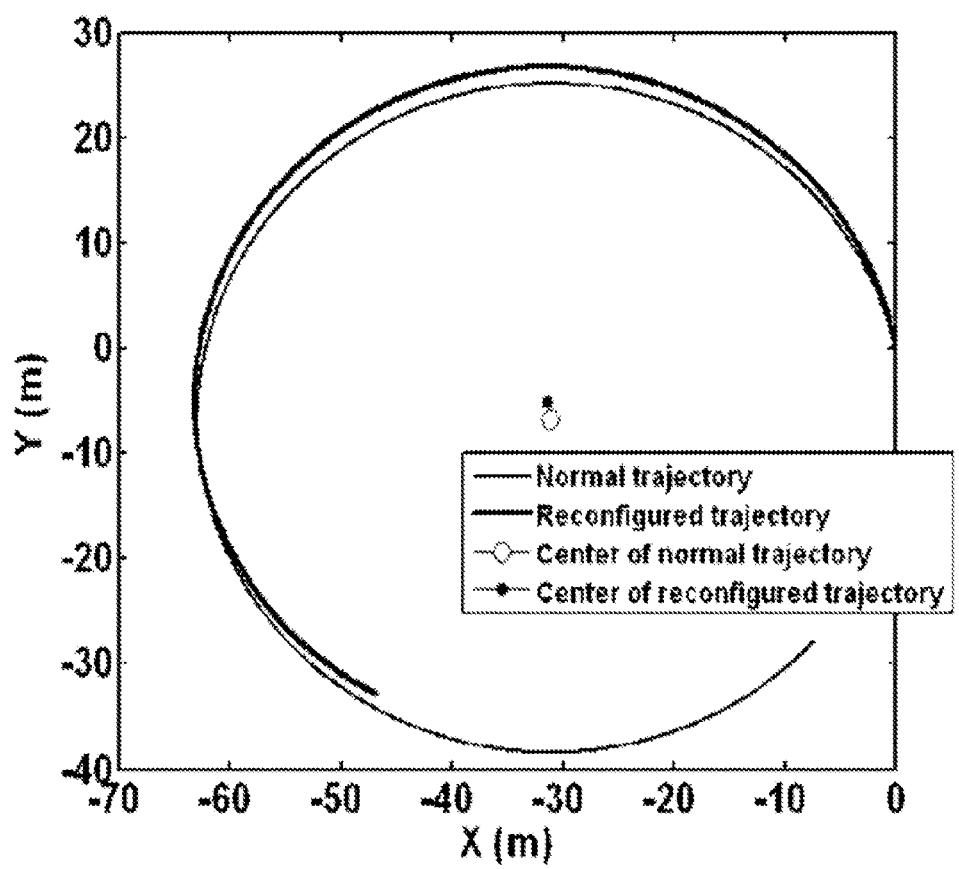
FIG. 10 is a diagram comparing the trajectories and the turning centers of a vehicle, when it is in a normal state without a fault and when fault management is performed.
Figure 11:
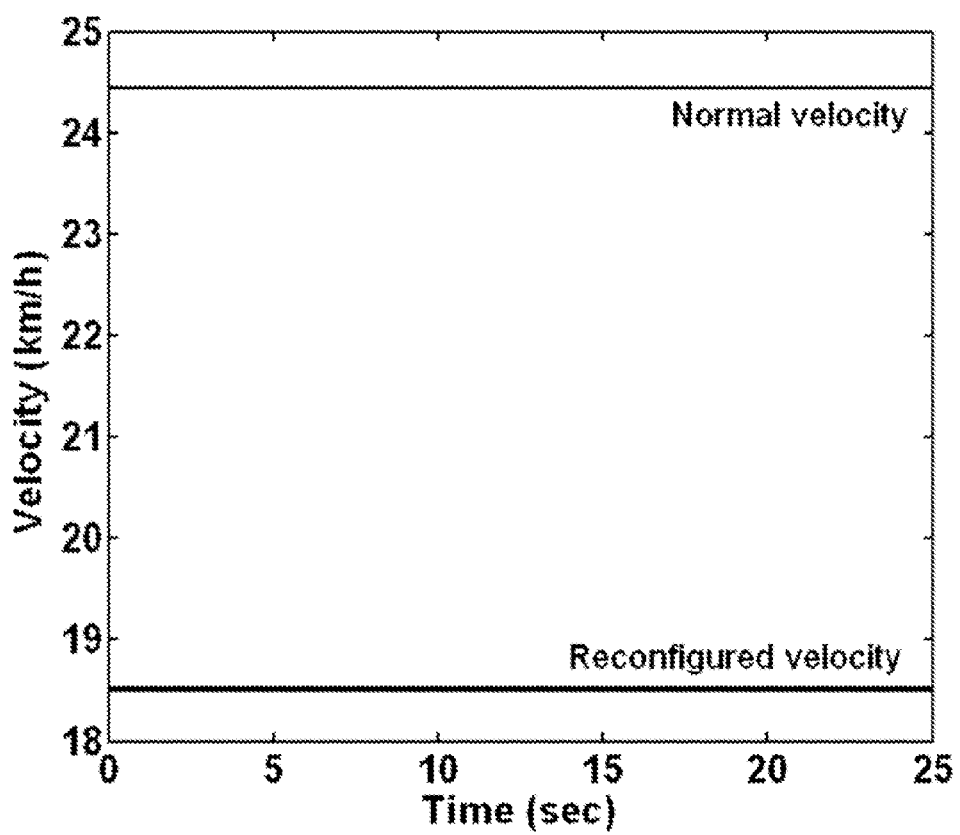
FIG. 11 is a diagram comparing the speeds of a vehicle, when it is in a normal state without a fault and when fault management is performed.

First, FIG. 10 shows the trajectories of a normal vehicle and a vehicle with a fault managed and the turning centers according to the trajectories. FIG. 11 shows the result that the speed of a vehicle decreases to keep the turning radius after a fault is managed. Referring to FIGS. 10 and 11, it can be seen that the speed of the vehicle reduced by about 6 km/h and the movement distance of the vehicle decreased.

Figure 12:
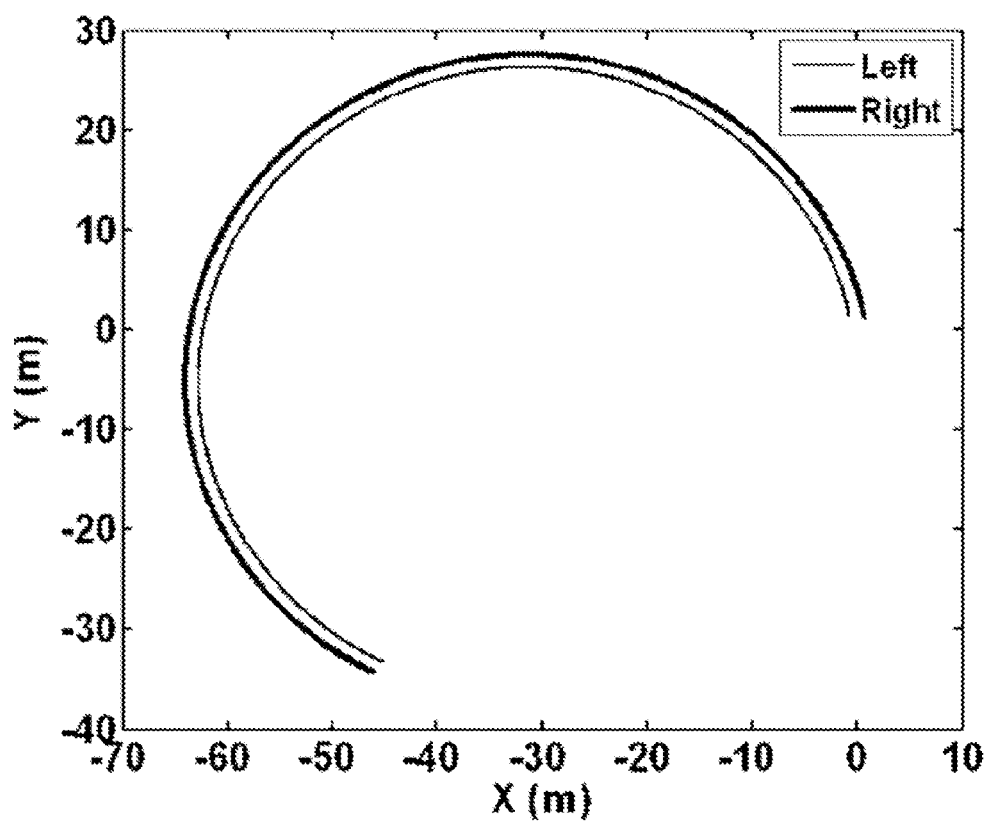
FIG. 12 is a diagram showing the trajectory of front wheels after fault management in accordance with the embodiment.
Figure 13:
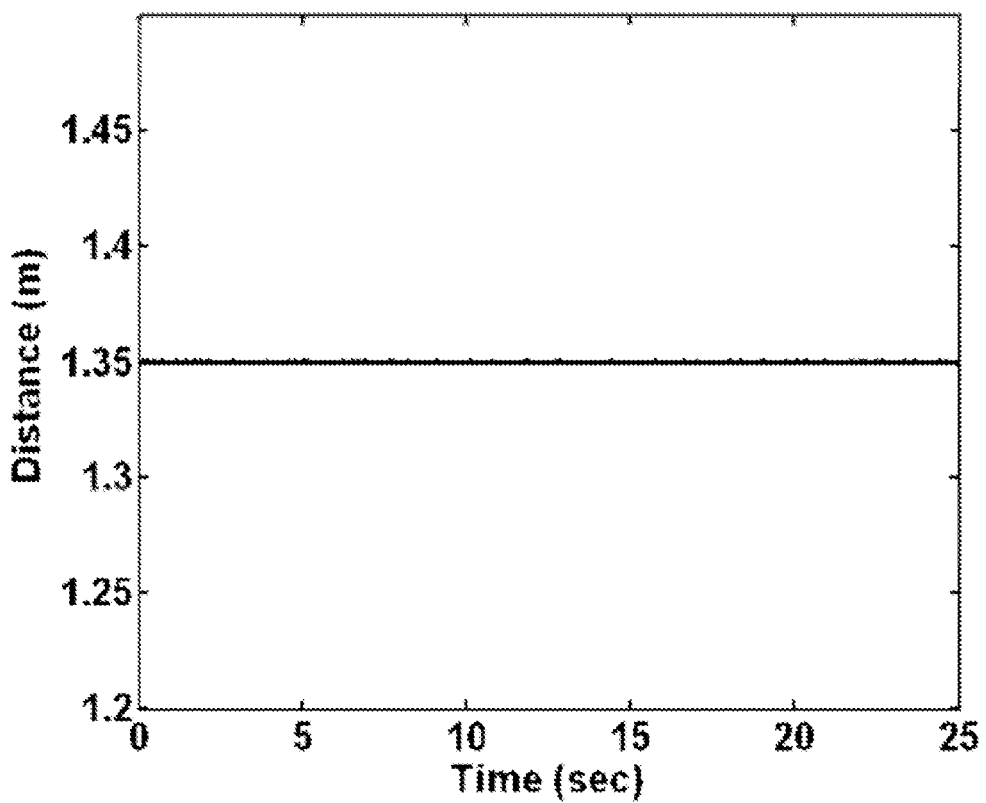
FIG. 13 is a diagram showing the distance between front wheels after fault management in accordance with the embodiment.
Figure 14:
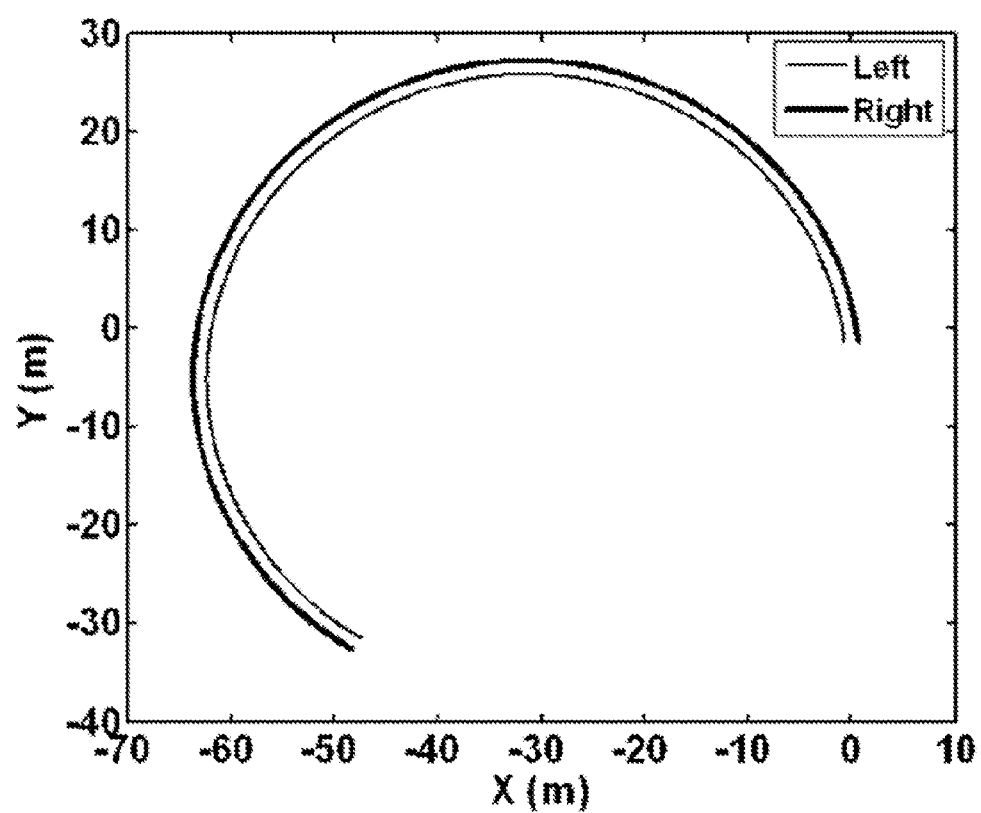
FIG. 14 is a diagram showing the trajectory of rear wheels after fault management in accordance with the embodiment.
Figure 15:
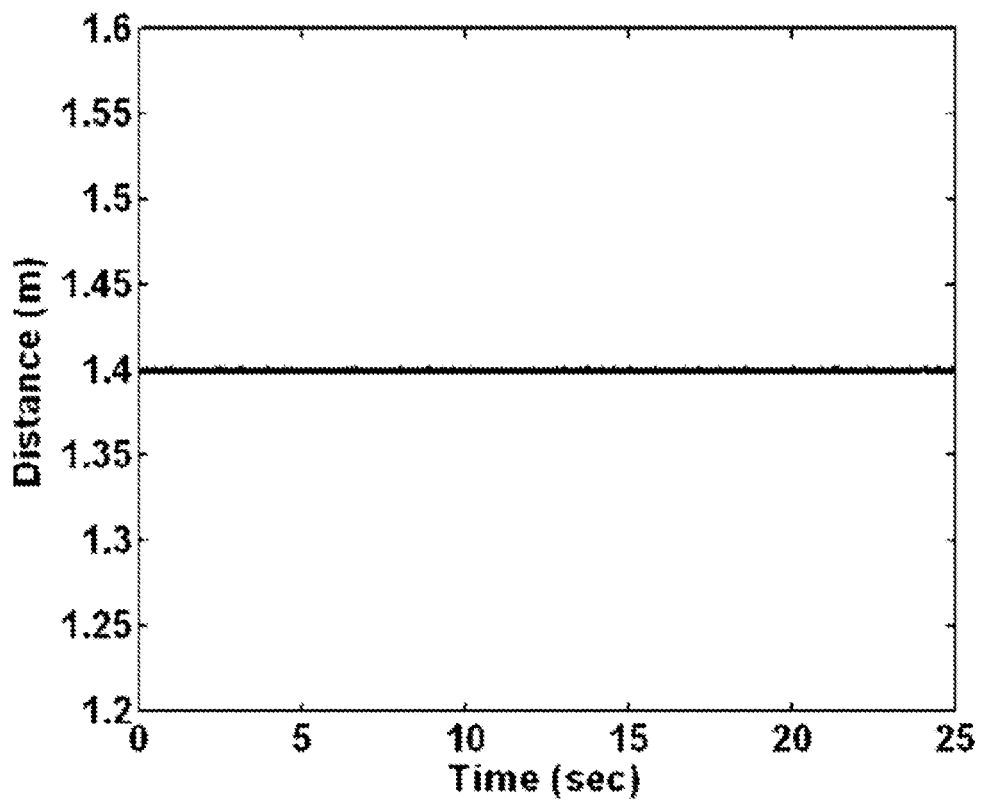
FIG. 15 is a diagram showing the distance between rear wheels after fault management in accordance with the embodiment.

FIGS. 12 and 13 show the turning trajectories of the left and right front wheels and the distance between the wheels. Further, FIGS. 14 and 15 show the turning trajectories of the left and right rear wheels and the distance between the wheels. Referring to FIGS. 12 to 15, as the result of adjusting steering input, using the fault management technology proposed in the embodiment, it can be seen that the transverse safety of the vehicle is ensured by maintaining the front width $w_f$, that is, the tread of the front axle and the rear width $w_r$, that is, the tread of the rear axle.

Figure 3:
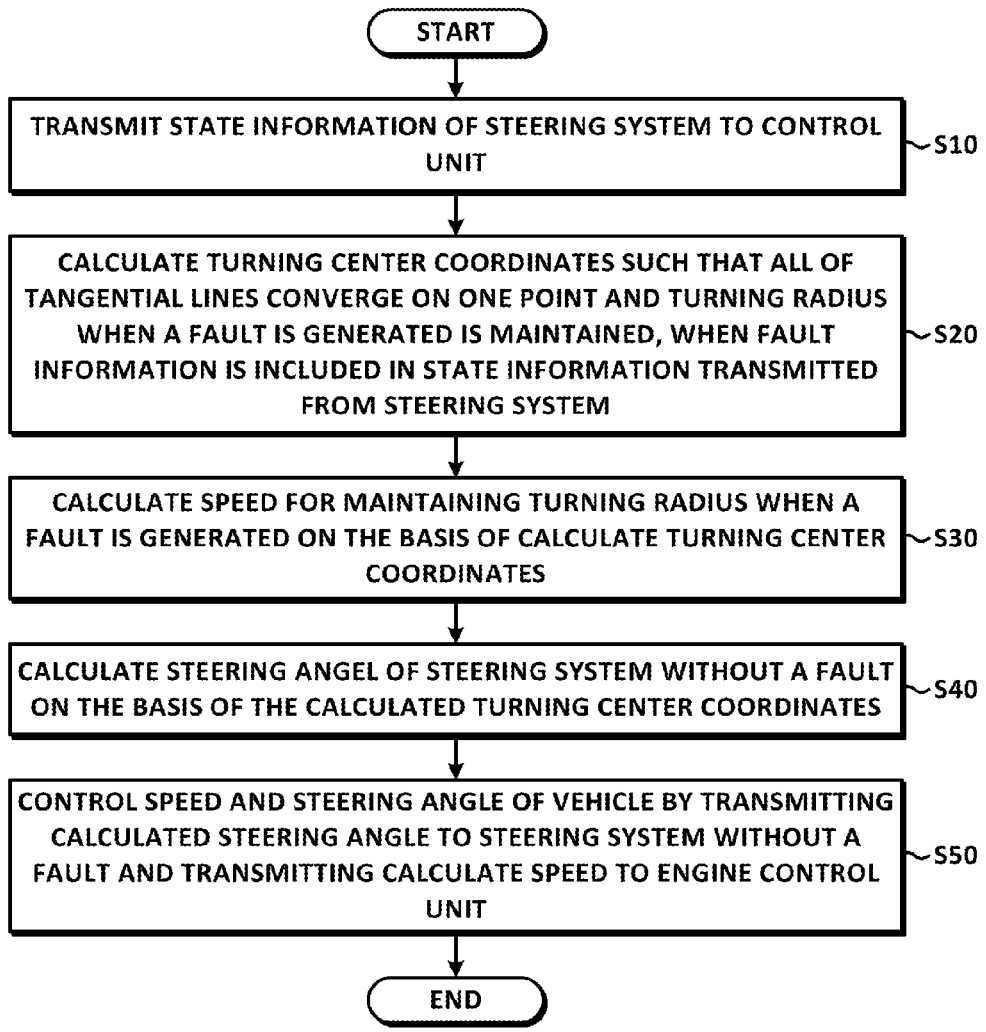
FIG. 3 is a diagram illustrating a fault management method for an independently controlled steering control system in a four wheel drive system according to an embodiment of the present disclosure.

A fault management method for an independently controlled steering system in a four wheel drive system according to an embodiment of the present disclosure is described hereafter further with reference to FIG. 3, avoiding repetition of the description of the apparatus.

FIG. 3 is a diagram illustrating a fault management method for an independently controlled steering control system in a four wheel drive system according to an embodiment of the present disclosure.

Further referring to FIG. 3, the fault management method for an independently controlled steering system in a four wheel drive system according to an embodiment of the present disclosure includes a state information transmission step S10, a turning center coordinate calculation step S20, a speed calculation step S30, a steering angle calculation step S40, and a speed/steering angle control step S50.

In the state information transmission step S10, the steering systems 12, 14, 16, and 18 for the four wheels of a vehicle transmit their state information to the turning center coordinate calculating unit 22 in the control unit 20.

In the turning center coordinate calculation step S20, when the state information transmitted from the steering systems is included in fault information, the turning center coordinate calculating unit 22 calculates turning center coordinates such that the tangential lines of all of the wheels converge on one point and the turning radii when a fault is generated are maintained.

The turning center coordinate calculation step S20 may be configured to calculate the turning center coordinates by calculating the intersection of the tangential line of the wheel with a fault and the circle with the turning radius when the fault is generated, as its radius.

In the speed calculation step S30, the speed calculation unit 24 in the control unit 20 calculates a speed for maintaining the turning radius when a fault is generated on the basis of the turning center coordinates calculated in the turning center coordinate calculation step S20.

In the steering angle calculation step S40, the steering angle calculation unit 26 in the control unit 20 calculates the steering angles of the steering system without a fault on the basis of the turning center coordinates calculated in the turning center coordinate calculation step S20.

In the speed/steering angle control step S50, the speed/steering angle control unit 28 controls the steering angle and the speed of the vehicle by transmitting the steering angles calculated in the steering angle calculation step S40 to the steering systems without a fault and transmitting the speed calculated in the speed calculation step S30 to the control unit.

The detailed methods of calculating the turning center coordinates, correcting the vehicle speed, and correcting the steering angle are substantially the same as the method in the fault management apparatus according to the embodiment, such that the detailed description is replaced with those of the apparatus.

As described in detail above, according to the present disclosure, when there is a fault in one or more wheels of a four wheel drive vehicle, it is possible to stabilize the vehicle body by actively adjusting the steering angles of the wheels that normally work and the speed of the vehicle in accordance with the fault environment.

Further, it is possible to keep the turning performance of a vehicle by keeping the turning radius constant before and after a fault is generated, in the process of managing a fault.

Although the scope of the disclosure was described with reference to the drawings, it is only an example and does not limit the present disclosure. Further, it should be understood that those skilled in the art may change and modify the present disclosure in various ways without departing from the scope of the present disclosure.

What is claimed is:

1. A fault management apparatus for an independently controlled steering system in a four wheel drive system, the apparatus comprising:
a steering system unit disposed at four wheels of a vehicle, controls steering of the wheels, and collects and transmits the state information of the wheels; and
a control unit controls the steering system unit in accordance with the state information transmitted from the steering system unit,
wherein the control unit includes:
a turning center coordinate calculating unit calculates turning center coordinates such that the tangential lines of all of the wheels without a fault converge on one point and the turning radii when a fault is generated are maintained when fault information is included in the state information transmitted from the steering system unit by the turning center coordinate calculating unit calculating new turning center coordinates by calculating the intersection of the tangential line of the wheel with a fault and a circle having the turning radius when a fault is generated as its radius;
a speed calculating unit calculates a speed for keeping the turning radius when a fault is generated on the basis of the turning center coordinates calculated by the turning center coordinate calculating unit;
a steering angle calculating unit calculates the steering angles of steering systems without a fault on the basis of the turning center coordinates calculated by the turning center coordinate calculating unit; and
a speed/steering angel control unit controls the steering angle and the speed of the vehicle by transmitting the steering angles calculated by the steering angle calculating unit to the steering systems without a fault and transmitting the speed calculated by the speed calculating unit to an engine control unit.

2. The apparatus according to claim 1, wherein the new turning center coordinates of the turning center when a steering system breaks is calculated by the following Expression 1, $$y = \tan(\delta_{km})(x-p)+q$$

$$x^2 + y^2 R^2 \qquad \text{<Expression 1>}$$

where $\delta_{km}$ the steering angle of the wheel with a fault, the subscript k is a symbol for showing which one of the left wheel steering system and the right wheel steering system is the steering system with the fault, the subscript m is a symbol for showing which one of the front steering system and the rear steering system is the steering system with the fault, and p and q are the rectangular coordinates of the steering system with the fault.

3. The apparatus according to claim 2, wherein the new turning center coordinates calculated by Expression 1 are $(x_{rec}, y_{rec})$, $$x_{rec} = \frac{-b_{km} \pm \sqrt{(b_{km})^2 - 4a_{km}c_{km}}}{2a_{km}}$$

$$y_{rec} = \tan(\delta_{km})(x_{rec} - p) + q$$

$$a_{km} = 1 + \tan^2(\delta_{km})$$

$$b_{km} = 2(q\tan(\delta_{km}) - p\tan^2(\delta_{km}))$$

$$c_{km} = p^2\tan^2(\delta_{km}) - 2pq\tan(\delta_{km}) + q^2 - R^2.$$

4. The apparatus according to claim 3, wherein the speed calculating unit calculates a corrected speed for maintaining the turning radius when the fault is generated, from the following Expression 3, $$V_r = R\delta_{o'} \qquad \text{<Expression 3>}$$

$$\delta_{o'} = \arctan\left(\frac{y_{rec}}{x_{rec}}\right)$$

where Vr is a corrected speed of the vehicle, R is the turning radius when a fault is generated, and $\delta_{o'}$ is a movement direction angular speed of the vehicle.

5. The apparatus according to claim 3, wherein the steering angle calculating unit calculates the corrected steering angle of a steering system without a fault from the following Expression 4, $$\delta_{km} = \arctan\left(\frac{y_{rec} - q}{x_{rec} - p}\right) \qquad \text{<Expression 4>}$$

where $\delta_{km}$ is the corrected steering angle of a steering system without a fault, and p and q are the rectangular coordinates of a steering system that normally works.

6. The apparatus according to claim 5, wherein the steering angle calculating unit calculates the steering angle $\delta_{rf}$ of the right front wheel steering system from $$\arctan\left(\frac{y_{rec} - a_f}{x_{rec} - w_f/2}\right),$$

the steering angle $\delta_{lr}$ of the left rear wheel steering system from $$\arctan\left(\frac{y_{rec} + a_r}{x_{rec} + w_r/2}\right),$$

and the steering angle $\delta_{rr}$ of the right rear wheel steering system from $$\arctan\left(\frac{y_{rec} + a_r}{x_{rec} - w_r/2}\right),$$

when there is a fault in the left front steering system.

7. The apparatus according to claim 5, wherein the steering angle calculating unit calculates the steering angle $\delta_{lf}$ of the left front wheel steering system from $$\arctan\left(\frac{y_{rec} - a_f}{x_{rec} + w_f/2}\right),$$

the steering angle $\delta_{lr}$ of the left rear wheel steering system from $$\arctan\left(\frac{y_{rec} + a_r}{x_{rec} + w_r/2}\right),$$

and the steering angle $\delta_{rr}$ of the right rear wheel steering system from $$\arctan\left(\frac{y_{rec} + a_r}{x_{rec} - w_r/2}\right),$$

when there is a fault in the right front steering system.

8. The apparatus according to claim 5, wherein the steering angle calculating unit calculates the steering angle $\delta_{lf}$ of the left front wheel steering system from $$\arctan\left(\frac{y_{rec} - a_f}{x_{rec} + w_f/2}\right),$$

the steering angle $\delta_{rf}$ of the right front wheel steering system from $$\arctan\left(\frac{y_{rec} - a_f}{x_{rec} - w_f/2}\right),$$

and the steering angle $\delta_{rr}$ of the right rear wheel steering system from $$\arctan\left(\frac{y_{rec} + a_r}{x_{rec} - w_r/2}\right),$$

when there is a fault in the left rear steering system.

9. The apparatus according to claim 5, wherein the steering angle calculating unit calculates the steering angle $\delta_{lf}$ of the left front wheel steering system from $$\arctan\left(\frac{y_{rec} - a_f}{x_{rec} + w_f/2}\right),$$

the steering angle $\delta_{rf}$ of the right front wheel steering system from $$\arctan\left(\frac{y_{rec} - a_f}{x_{rec} - w_f/2}\right),$$

and the steering angle $\delta_{lr}$ of the left rear wheel steering system from $$\arctan\left(\frac{y_{rec} + a_r}{x_{rec} + w_r/2}\right),$$

when there is a fault in the right rear steering system.

10. The apparatus according to claim 1, wherein the control unit is an engine control unit or a specific independent module.

11. A fault management method for an independently controlled system in a four wheel drive system, the method comprising:

a state information transmission step transmits state information of steering systems for four wheels of a vehicle;

a turning center coordinate calculation step calculates turning center coordinates such that the tangential lines of all of the wheels converge on one point without a fault and the turning radii when a fault is generated are maintained when fault information is included in the state information transmitted from the steering systems by the turning center coordinate calculating unit calculating new turning center coordinates by calculating the intersection of the tangential line of the wheel with a fault and a circle having the turning radius when a fault is generated as its radius;

a speed calculation step calculates a speed for keeping the turning radius when a fault is generated on the basis of the turning center coordinates calculated in the turning center coordinate calculation step;

a steering angle calculation step calculates the steering angles of steering systems without a fault on the basis of the turning center coordinates calculated in the turning center coordinate calculation step; and a speed/steering angel control step controls the steering angle and the speed of the vehicle by transmitting the steering angles calculated in the steering angle calculation step to the steering systems without a fault and transmitting the speed calculated in the speed calculation step to an engine control unit.

12. The method according to claim 11, wherein the new turning center coordinates of the turning center when a steering system breaks is calculated by the following Expression 1, $$y = \tan(\delta_{km})(x-p)+q$$
$$x^2 + y^2 R^2 \qquad \text{<Expression 1>}$$

where $\delta_{km}$ the steering angle of the wheel with a fault, the subscript k is a symbol for showing which one of the left wheel steering system and the right wheel steering system is the steering system with the fault, the subscript m is a symbol for showing which one of the front steering system and the rear steering system is the steering system with the fault, and p and q are the rectangular coordinates of the steering system with the fault.

13. The method according to claim 12, wherein the new turning center coordinates calculated by Expression 1 are $(x_{rec}, y_{rec})$, $$x_{rec} = \frac{-b_{km} \pm \sqrt{(b_{km})^2 - 4a_{km}c_{km}}}{2a_{km}}$$

$$y_{rec} = \tan(\delta_{km})(x_{rec} - p) + q$$

$$a_{km} = 1 + \tan^2(\delta_{km})$$

$$b_{km} = 2(q\tan(\delta_{km}) - p\tan^2(\delta_{km}))$$

$$c_{km} = p^2\tan^2(\delta_{km}) - 2pq\tan(\delta_{km}) + q^2 - R^2.$$

14. The method according to claim 13, wherein in the speed calculation step, a speed for maintaining the turning radius when the fault is generated is calculated from the following Expression 3, $$V_r = R\delta_{o'} \quad \langle \text{Expression 3} \rangle$$

$$\delta_{o'} = \arctan\left(\frac{y_{rec}}{x_{rec}}\right)$$

where Vr is a corrected speed of the vehicle, R is the turning radius when a fault is generated, and $\delta_{o'}$ is a movement direction angular speed of the vehicle.

15. The method according to claim 13, wherein in the steering angle calculation step, a corrected steering angle of a steering system without a fault is calculated by the following Expression 4, $$\delta_{km} = \arctan\left(\frac{y_{rec} - q}{x_{rec} - q}\right) \quad \langle \text{Expression 4} \rangle$$

where $\delta_{km}$ is the corrected steering angle of a steering system without a fault, and p and q are the rectangular coordinates of a steering system that normally works.

16. The method according to claim 15, wherein in the steering angle calculation step, the steering angle $\delta_{lf}$ of the right front wheel steering system is calculated from $$\arctan\left(\frac{y_{rec} - a_f}{x_{rec} - w_f/2}\right),$$

the steering angle $\delta_{rf}$ of the left rear wheel steering system is calculated from $$\arctan\left(\frac{y_{rec} + a_r}{x_{rec} + w_r/2}\right),$$

and the steering angle $\delta_{rr}$ of the right rear wheel steering system is calculated from $$\arctan\left(\frac{y_{rec} + a_r}{x_{rec} + w_r/2}\right),$$

when there is a fault in the left front steering system.

17. The method according to claim 15, wherein in the steering angle calculation step, the steering angle $\delta_{lf}$ of the left front wheel steering system is calculated from $$\arctan\left(\frac{y_{rec} - a_f}{x_{rec} + w_f/2}\right),$$

the steering angle $\delta_{lr}$ of the left rear wheel steering system is calculated from $$\arctan\left(\frac{y_{rec} + a_r}{x_{rec} + w_r/2}\right),$$

and the steering angle $\delta_{rr}$ of the right rear wheel steering system is calculated from $$\arctan\left(\frac{y_{rec} + a_r}{x_{rec} - w_r/2}\right),$$

when there is a fault in the right front steering system.

18. The method according to claim 15, wherein in the steering angle calculation step, the steering angle $\delta_{lf}$ of the left front wheel steering system is calculated from $$\arctan\left(\frac{y_{rec} - a_f}{x_{rec} + w_f/2}\right),$$

the steering angle $\delta_{rf}$ of the right front wheel steering system is calculated from $$\arctan\left(\frac{y_{rec} - a_f}{x_{rec} - w_f/2}\right),$$

and the steering angle $\delta_{rr}$ of the right rear wheel steering system is calculated from $$\arctan\left(\frac{y_{rec} + a_r}{x_{rec} - w_r/2}\right),$$

when there is a fault in the left rear steering system.

19. The method according to claim 15, wherein in the steering angle calculation step, the steering angle $\delta_{lf}$ of the left front wheel steering system is calculated from $$\arctan\left(\frac{y_{rec} - a_f}{x_{rec} + w_f/2}\right),$$

the steering angle $\delta_{rf}$ of the right front wheel steering system is calculated from $$\arctan\left(\frac{y_{rec} - a_f}{x_{rec} - w_f/2}\right),$$

and the steering angle $\delta_{lr}$ of the left rear wheel steering system is calculated from $$\arctan\left(\frac{y_{rec} + a_r}{x_{rec} + w_r/2}\right),$$

when there is a fault in the right rear steering system.

* * * * *